(12) United States Patent
Grund et al.

(10) Patent No.: US 10,392,956 B2
(45) Date of Patent: Aug. 27, 2019

(54) SEALING SYSTEM FOR A STEAM TURBINE, AND STEAM TURBINE

(71) Applicant: Siemens Aktiengesellschaft, Munich (DE)

(72) Inventors: Christoph Grund, Görlitz (DE); Detlef Haje, Görlitz (DE); Lutz Neumann, Görlitz (DE); Martin Zien, Görlitz (DE)

(73) Assignee: Siemens Aktiengesellschaft, Munich (DE)

( * ) Notice: Subject to any disclaimer, the term of this patent is extended or adjusted under 35 U.S.C. 154(b) by 511 days.

(21) Appl. No.: 15/104,641

(22) PCT Filed: Nov. 10, 2014

(86) PCT No.: PCT/EP2014/074129
§ 371 (c)(1),
(2) Date: Jun. 15, 2016

(87) PCT Pub. No.: WO2015/101437
PCT Pub. Date: Jul. 9, 2015

(65) Prior Publication Data
US 2016/0376905 A1 Dec. 29, 2016

(30) Foreign Application Priority Data
Dec. 30, 2013 (DE) .................. 10 2013 227 208

(51) Int. Cl.
*F01D 11/04* (2006.01)
*F01D 25/24* (2006.01)
*F16J 15/40* (2006.01)

(52) U.S. Cl.
CPC .............. *F01D 11/04* (2013.01); *F01D 25/24* (2013.01); *F16J 15/40* (2013.01);
(Continued)

(58) Field of Classification Search
CPC . F01D 11/04; F01D 25/24; F16J 15/40; F05D 2220/31; F05D 2240/55; F05D 2240/60
See application file for complete search history.

(56) References Cited

U.S. PATENT DOCUMENTS 3,312,064 A * 4/1967 Dickinson ............... F01D 11/06
277/319
4,272,084 A * 6/1981 Martinson .............. F16J 15/006
277/365
(Continued)

FOREIGN PATENT DOCUMENTS

CH 225023 A 12/1942
CN 102165228 A 8/2011
(Continued)

OTHER PUBLICATIONS

CN Office Action dated Dec. 1, 2016, for CN patent application No. 201480071873.X.

*Primary Examiner* — Carlos A Rivera
*Assistant Examiner* — Eric J Zamora Alvarez
(74) *Attorney, Agent, or Firm* — Beusse Wolter Sanks & Maire

(57) ABSTRACT

A sealing system for sealing a sealing gap between an outer housing and a rotor shaft of a rotor of a steam turbine, having a blocking medium wall for producing a blocking medium area between the rotor shaft and the outer housing in the region in front of and/or in the sealing gap, wherein the blocking medium wall is secured to the outer housing. The sealing system also has a blocking medium opening in the blocking medium wall in order to feed a blocking medium from the outside into the blocking medium area. The sealing system also has a shaft seal for sealing the blocking medium area from a second area, which has a second pressure that is lower than the first pressure, and a sliding ring seal for (Continued)

sealing the blocking medium area from a third area, which has a third pressure that is lower than the second pressure.

15 Claims, 3 Drawing Sheets

(52) U.S. Cl.
CPC ...... *F05D 2220/31* (2013.01); *F05D 2240/55* (2013.01); *F05D 2240/60* (2013.01)

(56) References Cited

U.S. PATENT DOCUMENTS

| | | | | | |
|---|---|---|---|---|---|
| 4,889,348 | A * | 12/1989 | Amundson | ............ | F04D 29/126 |
| | | | | | 277/306 |
| 5,039,113 | A * | 8/1991 | Gardner | ............... | F16J 15/3412 |
| | | | | | 277/348 |
| 5,412,977 | A * | 5/1995 | Schmohl | ................. | F01D 11/06 |
| | | | | | 277/318 |
| 5,421,593 | A * | 6/1995 | Aritsubo | .............. | F16J 15/3484 |
| | | | | | 277/361 |
| 5,498,007 | A * | 3/1996 | Kulkarni | .............. | F16J 15/3412 |
| | | | | | 277/366 |
| 5,538,257 | A * | 7/1996 | Sandgren | ................... | F16D 1/08 |
| | | | | | 277/379 |
| 5,558,342 | A * | 9/1996 | Sedy | ..................... | F16J 15/3464 |
| | | | | | 277/390 |
| 5,873,574 | A * | 2/1999 | Ringer | ................. | F16J 15/3476 |
| | | | | | 277/348 |
| 5,901,965 | A * | 5/1999 | Ringer | .................. | F16J 15/363 |
| | | | | | 277/361 |
| 6,109,617 | A * | 8/2000 | Laney | ................. | F16J 15/3484 |
| | | | | | 277/369 |
| 6,325,382 | B1 * | 12/2001 | Iwamoto | .............. | F16J 15/3404 |
| | | | | | 277/368 |
| 6,345,954 | B1 * | 2/2002 | Al-Himyary | ......... | F04D 29/122 |
| | | | | | 277/318 |
| 6,431,551 | B1 * | 8/2002 | Fuse | ...................... | F16J 15/342 |
| | | | | | 277/390 |
| 6,460,858 | B1 * | 10/2002 | Kitajima | .............. | F16J 15/3452 |
| | | | | | 277/358 |
| 6,932,348 | B2 * | 8/2005 | Takahashi | ............ | F16J 15/3404 |
| | | | | | 277/359 |
| 7,854,584 | B2 * | 12/2010 | Lusted | .................. | F01D 11/001 |
| | | | | | 277/355 |
| 7,854,587 | B2 * | 12/2010 | Ito | ......................... | F04D 29/124 |
| | | | | | 415/168.2 |
| 7,878,509 | B2 * | 2/2011 | Takahashi | .............. | F16J 15/348 |
| | | | | | 277/359 |
| 8,201,830 | B2 * | 6/2012 | Nobrega | ................ | F16J 15/348 |
| | | | | | 277/345 |
| 9,574,667 | B2 * | 2/2017 | Takahashi | .............. | F16J 15/342 |
| 2007/0295402 | A1 * | 12/2007 | Awtar | ..................... | F01D 11/14 |
| | | | | | 137/119.01 |
| 2009/0140495 | A1 | 6/2009 | Dreifert et al. | | |
| 2011/0189013 | A1 * | 8/2011 | Alfes | ..................... | F16J 15/002 |
| | | | | | 415/230 |
| 2011/0198813 | A1 * | 8/2011 | Takahashi | .............. | F04D 29/122 |
| | | | | | 277/387 |
| 2012/0043727 | A1 | 2/2012 | Alfes et al. | | |
| 2012/0082546 | A1 | 4/2012 | Grieshaber | | |
| 2013/0115049 | A1 | 5/2013 | Grieshaber | | |
| 2013/0189081 | A1 * | 7/2013 | Bryant | ..................... | F02C 7/055 |
| | | | | | 415/121.2 |
| 2013/0259679 | A1 * | 10/2013 | Brailean | ................ | F16J 15/008 |
| | | | | | 415/230 |
| 2014/0030063 | A1 * | 1/2014 | Mateman | ............... | F16J 15/002 |
| | | | | | 415/110 |

FOREIGN PATENT DOCUMENTS

| | | |
|---|---|---|
| CN | 102348915 A | 2/2012 |
| CN | 102459820 A | 5/2012 |
| CN | 102985727 A | 3/2013 |
| DE | 1817012 A1 | 8/1969 |
| EP | 1866560 A1 | 12/2007 |
| EP | 2261464 A1 | 12/2010 |
| EP | 2650485 A2 | 10/2013 |
| GB | 1193800 A | 6/1970 |
| JP | 2006063958 A | 3/2006 |
| WO | 2006106069 A1 | 10/2006 |

* cited by examiner

SEALING SYSTEM FOR A STEAM TURBINE, AND STEAM TURBINE

CROSS REFERENCE TO RELATED APPLICATIONS

This application is the US National Stage of International Application No. PCT/EP2014/074129 filed Nov. 10, 2014, and claims the benefit thereof. The International Application claims the benefit of German Application No. DE 102013227208.1 filed Dec. 30, 2013. All of the applications are incorporated by reference herein in their entirety.

FIELD OF INVENTION

The present invention relates to a sealing system for sealing a sealing gap between an outer casing and a rotor shaft of a rotor of a steam turbine. The invention also relates to a steam turbine.

BACKGROUND OF INVENTION

A steam turbine has an outer casing and a rotor which is rotatably mounted in the outer casing. During operation of the steam turbine, steam enters the outer casing, the enthalpy of this steam is dissipated on a blading of the rotor such that the rotor is driven in rotation.

The rotor has a rotor shaft which is mounted at each of its longitudinal ends with a bearing which is provided in the outer casing. Since, during operation of the steam turbine, the rotor shaft moves relative to the outer casing, at least one sealing gap is provided between the rotor shaft and the outer casing such that the rotor shaft does not rub against the outer casing. Due to the overpressure of the steam within the steam turbine, steam leaks through the sealing gap. Efforts are made to seal this sealing gap as effectively as possible such that the leakage of steam through this sealing gap is as small as possible. This means that the necessary shaft seal(s) must be created such that no steam escapes outward and no air can penetrate into the interior of the steam turbine.

FIG. 1 shows a conventional steam turbine 101 with an outer casing 102, a rotor 103 and a rotor shaft 104. At one longitudinal end of the rotor shaft 104, this shaft has, between a bearing and the process side of the steam turbine 101, a bearing-side shaft section 105 and a process-side shaft section 106. The transition from the bearing-side shaft section 105 to the process-side shaft section 106 consists of a shaft step 107, wherein the bearing-side shaft section 105 has a smaller outer diameter than the process-side shaft section 106. The process-side shaft section 106 of the rotor shaft 104 passes through the outer casing 102, defining a seal region 108. The seal section 108 is sealed with a shaft seal 109 which has a bearing-side labyrinth 110, a process-side labyrinth 111 and an intermediate labyrinth 112. The labyrinths 110 to 112 are provided on the process side shaft section 106.

Between the bearing-side labyrinth 110 and the intermediate labyrinth 112 there is provided, in the outer casing 102, a duct for the removal of vapor steam 114, and between the intermediate labyrinth 112 and the process-side labyrinth 111 there is provided a duct in the outer casing 102 for the supply and/or removal of barrier steam 113. The labyrinths 110 to 112 are for example in the form of a see-through labyrinth, a full labyrinth, a stepped labyrinth or a comb-groove labyrinth.

As an alternative to labyrinth seals, it is known to use see-through seals for steam turbines. However, both labyrinth seals and see-through seals require a cost-intensive leakage and barrier steam system due to the leakage quantities incurred.

SUMMARY OF INVENTION

Accordingly, the present invention has an object of at least partially alleviating the above-described drawbacks in sealing an outer casing with respect to the rotor shaft of a rotor of a steam turbine. In particular, an outer casing is to be sealed with respect to the rotor shaft of a rotor of a steam turbine such that a cost-intensive leakage and barrier steam system can be omitted.

The above object is achieved with a sealing system, and with a steam turbine as claimed. Other features and details of the invention can be found in the subclaims, the description and the drawings. Here, features and details which are described in conjunction with the sealing system, are of course also applicable in conjunction with the steam turbine according to the invention and respectively vice versa, such that with regard to the disclosure relating to the individual aspects of the invention, reference is always made or can always be made reciprocally.

According to the first aspect of the invention, the object is achieved with a sealing system for sealing a sealing gap between an outer casing and a rotor shaft of a rotor of a steam turbine. The sealing system has a barrier medium wall to create a barrier medium space between the rotor shaft and the outer casing in the region in front of and/or in the sealing gap, wherein the barrier medium wall can be attached to the outer casing. The sealing system also has a barrier medium opening in the barrier medium wall for supplying barrier medium from outside into the barrier medium space. The sealing system also has a shaft seal, in particular a labyrinth seal or see-through seal, for sealing the barrier medium space with respect to a second space in which a second pressure, smaller than the first pressure, prevails, and a floating ring seal for sealing the barrier medium space with respect to a third space in which a third pressure, smaller than the second pressure, prevails.

The barrier medium can for example be air, steam, gas, organic medium, etc. In particular, the barrier medium is the operating medium of the steam turbine. The steam turbine can, within the meaning of the invention, also be a condensing turbine.

Such a sealing system makes it possible for the barrier medium space to be filled with a barrier medium at a first pressure which is slightly higher than the highest pressure of one of the adjacent spaces to be sealed with respect to the barrier medium space. The adjacent space can for example be the environment outside the outer casing of the steam turbine or the process space in the steam turbine. The sealing system is designed such that the floating ring seal of the sealing system is used to seal the barrier medium space with respect to the space in which the lower pressure prevails. This means that, if the pressure in the second space is lower than in the third space, the floating ring seal is used to seal with respect to this space. The shaft seal is then used to seal with respect to the third space, with respect to which the pressure difference with respect to the first pressure in the barrier medium space is greater than with respect to the second space. If, for example, the process space of the steam turbine is at a higher pressure than the environment outside the outer casing of the steam turbine, the barrier medium space is filled with a barrier medium at a first pressure which is slightly higher than the pressure in the process space. The sealing gap between the barrier medium space and the process space is then sealed with the shaft seal since the pressure difference between these two spaces is small. The floating ring seal is used in the sealing gap between the outer casing and the rotor shaft which separates the barrier medium space and the environment, and better seals the larger pressure difference between the barrier medium space and the environment.

If the steam turbine is a condensing turbine, it is possible that there exists, in the process space of the condensing turbine, an underpressure which is lower than the ambient pressure. Thus, the barrier medium space is filled with a barrier medium at a first pressure which is slightly higher than the pressure in the environment. The sealing gap between the barrier medium space and the environment is then sealed by means of the shaft seal, while the sealing gap between the barrier medium space and the process space is sealed by the floating ring seal.

The sealing system is advantageously flexible, such that depending on the prevailing pressures within the steam turbine and outside the outer casing of the steam turbine, the floating ring seal can be arranged in the sealing gap between the barrier medium space and the process space or in the sealing gap between the barrier medium space and the environment. The shaft seal is then accordingly used to seal the respective other sealing gap. What is decisive in the sealing system is that the barrier medium space is always filled with barrier medium at a slightly higher pressure than the higher of the pressures in the two adjoining spaces.

Such a sealing system permits the use of at least one floating ring seal to seal a sealing gap between the outer casing and a rotor shaft of a rotor of a steam turbine, that is to say to seal the process space of the steam turbine with respect to the environment. This is made possible by the formation of a barrier medium space between the rotor shaft and the outer casing in the region in front of and/or in the sealing gap. Depending on whether the seal accordingly used is arranged immediately in front of the sealing gap between the outer casing and the rotor shaft or in the sealing gap between the outer casing and rotor shaft, the barrier medium space extends to just in front of the sealing gap or into the sealing gap. The use of at least one floating ring seal saves a cost-intensive leakage and barrier steam system, as is necessary in other shaft seals such as labyrinth seals or see-through seals. Floating ring seals require the purest possible medium in the sealing gap, which is to be sealed, between the outer casing and the rotor shaft or between the barrier medium wall and the rotor shaft. The supply of pure barrier medium to the floating ring seal is made possible through the barrier medium space which is formed by the barrier medium wall in conjunction with the outer casing and the rotor shaft.

The barrier medium wall of a sealing system is attached in a sealing manner to the outer casing. In addition, the shaft seal, in particular a labyrinth or see-through seal, ensures that the second sealing gap is also very well sealed with respect to the rotor shaft. The barrier medium opening in the barrier medium wall permits a supply of barrier medium, i.e. for example purified ambient air or purified steam, from outside, that is to say from the environment or from the process space, into the barrier medium space such that the floating ring seal comes into contact only with the purified barrier medium.

In order, for example, not to have to filter all of the steam which enters into the steam turbine, it is possible for example for a small quantity of steam, so-called bypass steam, to be diverted from the feed steam flow to the steam turbine and then purified in a purification device such as a filter in order to then be brought before the floating ring seal of the corresponding sealing system. This ensures that the floating ring seal of the sealing system is not damaged by particulate contamination in the steam. The purified steam can also be used in order that the floating ring seal need seal in only one direction over the entire operating range. To that end, the purified barrier medium is introduced into the barrier medium space at a first pressure which is slightly higher than the higher of the two pressures in the second or third spaces bounded by the sealing system.

A sealing system according to the invention prevents, in a simple manner, damage occurring to the floating ring seal. By using purified barrier medium, such as for example bypass steam, it is possible to ensure that the pressure drop over the floating ring seal is always in the same direction.

According to a refinement, it is possible to provide, in a sealing system, that the barrier medium space is designed to accommodate a pressure which is higher than the pressure in the second and in the third space.

According to a refinement, it is possible to provide, in a sealing system, that the floating ring seal can be arranged on that side of the barrier medium wall which is oriented toward the rotor shaft, and on the rotor shaft. The barrier medium wall is in particular arranged on the outer casing such that it runs parallel to the rotor shaft in the region of the sealing gap between the outer casing and the rotor shaft. The floating ring seal or part of the floating ring seal is attached to this side of the barrier medium wall running parallel to the rotor shaft. The other part of the floating ring seal is attached to the rotor shaft to form the floating ring seal.

The floating ring seal advantageously has a floating ring and a support ring. One of the two rings is attached to the outer casing, in particular to the barrier medium wall. The second ring is attached to the rotor shaft, facing the first ring. For example, the floating ring can be attached, sprung, to the outer casing or to the barrier medium wall and the support ring can be attached to the rotor shaft. The support ring can be attached to the rotor shaft for example with the aid of rotation-preventing pins. Both rings have planar, mutually parallel surfaces. The surfaces of the rings can run parallel to the longitudinal axis of the rotor shaft. However, the rings of the floating ring seal can also be arranged such that the surfaces of the rings run perpendicular to the longitudinal axis of the rotor shaft.

The rings, or at least the surfaces of the rings, can for example be made of carbon-graphite materials, metal, ceramic, plastic or synthetic resin-bonded carbon. A possible combination of the floating ring seal would for example be, as floating ring, a carbon ring against a support ring made of silicon carbide.

Advantageously, it can be provided in a sealing system that, at the barrier medium opening, there is arranged a barrier medium line for fluidically connecting the barrier medium space to a purification device of the sealing system which prepares barrier medium, in particular purified air or purified steam. The barrier medium line can be flexible or rigid. A purification device of a first sealing system can for example be designed for the purification of ambient air. A purification device of a second sealing system can for example be designed for the purification of steam from the process space. That means that, if the barrier medium space is outside the process space, suitable ambient air can be supplied to the barrier medium space of the corresponding sealing system, and if the barrier medium space is inside the process space, suitable steam can be supplied to the barrier medium space of the corresponding sealing system.

Furthermore, it is possible to provide, in a sealing system, that a barrier medium valve is arranged in the barrier medium opening or in the barrier medium line. This makes it possible not only to meter the barrier medium supplied to the barrier medium space but also to set the pressure of the barrier medium within the barrier medium space.

In a sealing system, the barrier medium wall can be formed in two or more parts, wherein all of the barrier medium walls can be secured to one another in a sealing fashion. One part of the barrier medium wall can be attached in a sealing fashion to the outer casing. The barrier medium wall, or a first part of the barrier medium wall, can be attached in a sealing fashion to the outer casing, in particular with a force fit, for example by means of screw connections.

Furthermore, it can be provided in a sealing system that the shaft seal is arranged on a first barrier medium wall and in that either the floating ring or the support ring of the floating ring seal can be secured to the second barrier medium wall. Such a sealing system permits good sealing of the environment with respect to the process space of a steam turbine or of the process space with respect to the environment. Alternatively, the shaft seal can be additionally or only attached to the rotor shaft. It is also conceivable that the floating ring is arranged on the rotor shaft and the support ring of the floating ring seal is arranged on the outer casing or on the barrier medium wall.

According to a second aspect of the invention, the object is achieved with a steam turbine having an outer casing and a rotor with a rotor shaft, having at least one sealing gap between the outer casing and the rotor shaft. The steam turbine is characterized in that it has at least one sealing system according to the first aspect of the invention for sealing the at least one sealing gap between the outer casing and the rotor shaft. The steam turbine can, within the meaning of the invention, be a condensing turbine.

Such a steam turbine ensures, in a manner which is simpler in terms of construction and more cost-effective, that the process space of the steam turbine is reliably protected both from escaping steam and from inflowing air.

In order to seal the steam turbine with respect to escaping steam, it can for example be provided for a small quantity of steam from the process space of the steam turbine to be diverted from the feed steam flow, purified in a purification device and then be brought to the barrier medium space before the floating ring seal inside the process space of the steam turbine. That means that it is sufficient for only a small quantity of steam to be purified and fed to the corresponding sealing system inside the process space. This purified steam can also be used in order that the floating ring seal need seal in only one direction over the entire operating range. To that end, the purified steam is introduced into the barrier medium space at a pressure higher than the pressure in the separated spaces.

In order to seal the steam turbine with respect to inflowing air, it is for example possible for purified ambient air to be supplied to the sealing system, that is to say to the barrier medium space before the floating ring seal outside the process space of the steam turbine. That is to say that purified air of sufficient purity is conveyed from outside, before the floating ring seal into the barrier medium space. This ensures that the floating ring seal is not damaged by particulate contamination.

Accordingly, a steam turbine having at least two sealing systems according to the invention is advantageous. A first sealing system sits outside the process or steam space of the steam turbine, a second sealing system sits inside the process or steam space of the steam turbine. In the case of both sealing systems, a barrier space wall creates a barrier medium space before the respective floating ring seal. Purified ambient air can be introduced into the barrier medium space of the first sealing system for example via a barrier space opening in the barrier space wall, and purified steam can be introduced into the barrier medium space of the second sealing system for example via a barrier space opening in the barrier space wall. The purified ambient air or, respectively, the purified steam in each case ensures, in a simple and cost-effective manner, that the corresponding floating ring seals are not damaged by contaminants in the ambient air or in the steam. Advantageous therefore is a steam turbine which has two purification devices for barrier medium, for example one purification device for purifying ambient air and one purification device for purifying steam.

Also advantageous is a steam turbine in which the outer casing has attachment devices for attaching the barrier medium wall of the at least one sealing system.

The barrier medium wall of a sealing system is advantageously arranged in sealing fashion on that side, the so-called end face, of the outer casing, which is oriented toward the rotor shaft. It can however also be arranged in sealing fashion on the side of the outer casing.

According to one refinement of the invention, it can be provided in a steam turbine that the shaft seal seals the barrier medium space with respect to a second space in which a second pressure, lower than the first pressure, prevails, and that the floating ring seal seals the barrier medium space with respect to a third space in which a third pressure, lower than the second pressure, prevails.

The steam turbine advantageously has pumps which are designed to raise the pressure on the barrier medium.

In the case of a steam turbine, it can further be provided that the floating ring of the at least one floating ring seal is attached on that side of the barrier medium wall which is oriented toward the rotor shaft and the support ring of the at least one floating ring seal on the rotor shaft.

All of the advantages which have been described with respect to the sealing system according to the first aspect of the invention equally apply accordingly to the steam turbine.

BRIEF DESCRIPTION OF THE DRAWINGS

A steam turbine according to the invention and a sealing system according to the invention will be explained in greater detail below with reference to drawings, in which, schematically in each case.

DETAILED DESCRIPTION OF INVENTION

Figure 1:
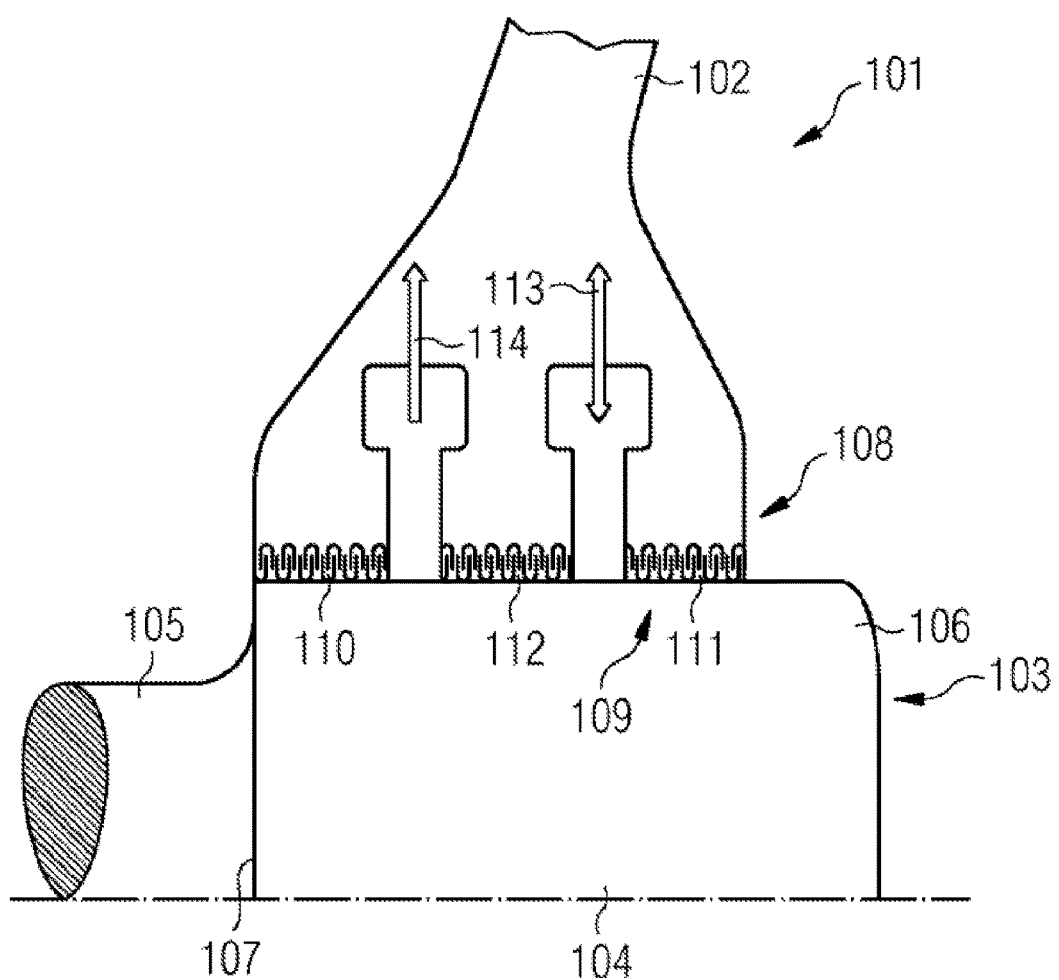
FIG. 1 shows a longitudinal section in the shaft region of a steam turbine according to the prior art.
Figure 2:
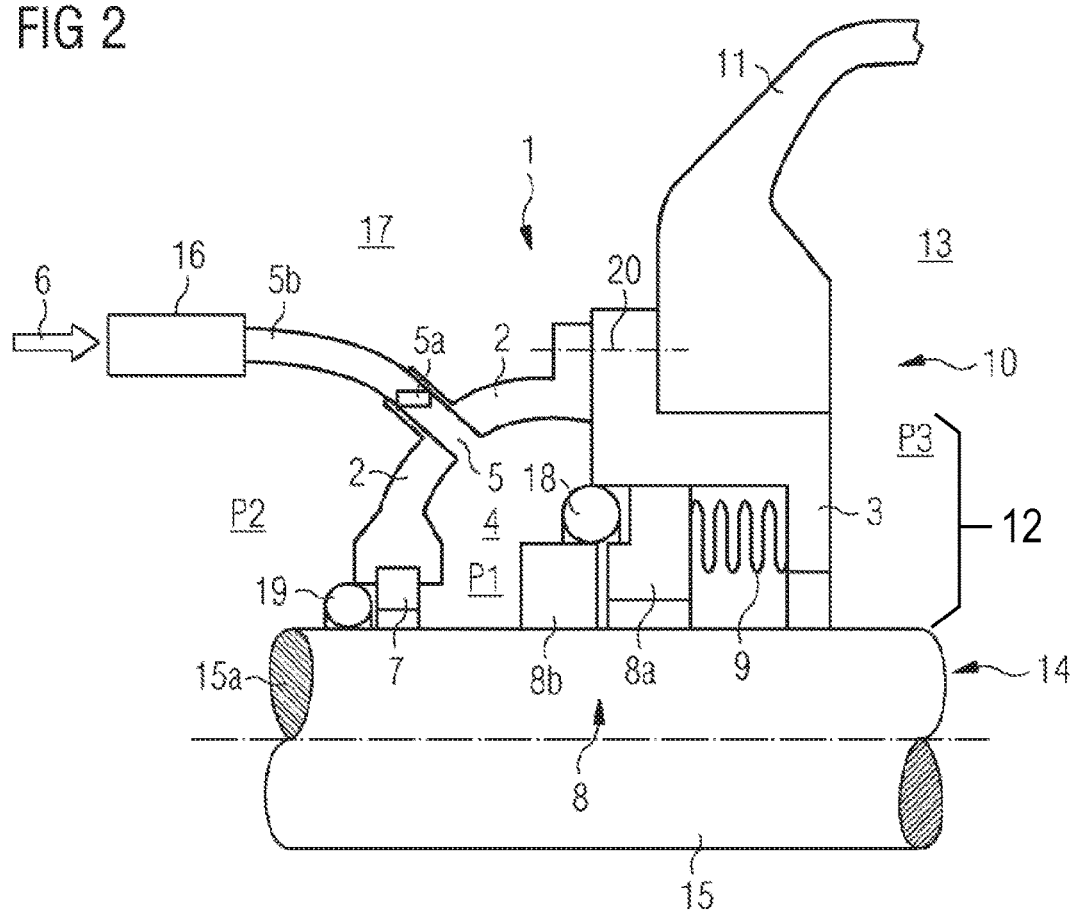
FIG. 2 shows a longitudinal section through a first shaft region of a steam turbine according to the invention.
Figure 3:
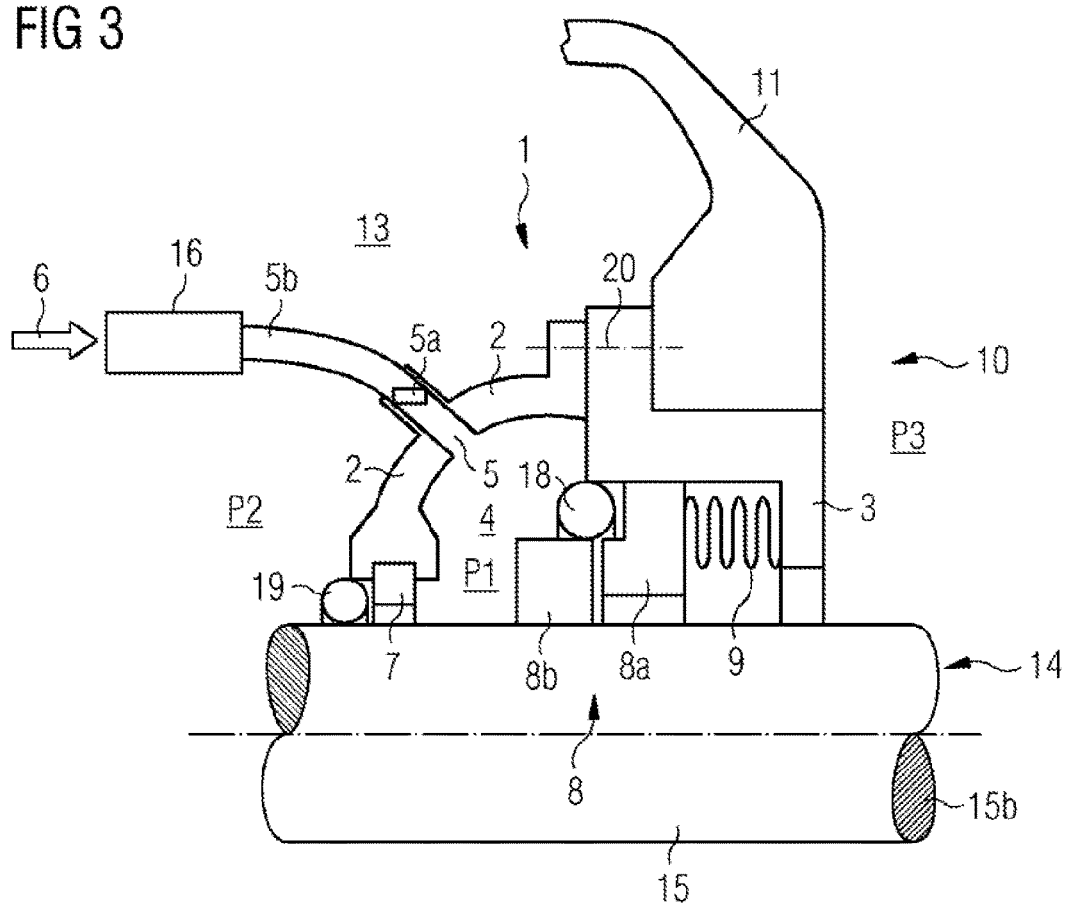
FIG. 3 shows a longitudinal section through a second shaft region of a steam turbine according to the invention.

In FIGS. 2 and 3, elements of identical function and action are in each case provided with the same reference signs.

FIGS. 2 and 3 each show, schematically and in longitudinal section, the shaft region of a steam turbine 10 according to the invention. FIG. 2 shows a sealing system 1 which seals the process space 13 of the steam turbine 10 against inflowing ambient air. FIG. 3 shows a sealing system 1 which seals the process space 13 of the steam turbine 10 against escaping steam from the process space 13.

Each sealing system 1 is designed to seal a sealing gap 12 between the outer casing 11 and the rotor shaft 15 of the rotor 14 of the steam turbine 10.

The sealing system 1 in FIG. 2 has a two-part barrier medium wall 2, 3 to create a barrier medium space 4 between the rotor shaft 15 and the outer casing 11 of the steam turbine 10 in the environment-side region before or in the sealing gap 12. A second part of the barrier medium wall 3 is attached with a force-fitting connection 20, for example a screw connection, to the outer casing 11 of the steam turbine 10. In the barrier medium wall 2, 3, here in the first part of the barrier medium wall 2, there is provided a barrier medium opening 5 for supplying purified barrier medium 6 at a first pressure P1 from outside via the barrier medium line 5b into the barrier medium space 4. The barrier medium 6 is pumped into the barrier medium space 4 at a first pressure P1 such that the first pressure P1 in the barrier medium space 4 is higher than both the second pressure P2 of the environment and the third pressure P3 in the process space 13 within the steam turbine 10. In order to regulate both the flow of barrier medium 6 into the barrier medium space 4 and the first pressure P1 in the barrier medium space 4, a barrier medium valve 5a is arranged in the barrier medium line 5b. Further, a pump (not shown) can be provided to generate the first pressure P1 of the barrier medium 6. In order to purify the barrier medium 6, in this case the ambient air, there is provided a purification device 16, for example an air filter. The sealing system 1 also has a shaft seal 7, in particular a labyrinth or see-through seal, which serves to seal the barrier medium wall 2 and the rotor shaft 15 between the barrier medium space 4 and the environment 17. Also, the sealing system 1 has a floating ring seal 8 for sealing the sealing gap 12 between the outer casing 11 and the rotor shaft 15, between the barrier medium space 4 and the process space 13. The second pressure P2, that is to say the ambient pressure, is in this case higher than the third pressure P3, in this case the pressure in the process space 13. This means that, since the barrier medium 6 is introduced into the barrier medium space 4 at a first pressure P1 which is higher than both the second pressure P2 and the third pressure P3, there is between the process space 13 and the barrier medium space 4 a greater pressure difference than between the barrier medium space 4 and the environment 17. For that reason, the floating ring seal 8 is arranged between the process space 13 and the barrier medium space 4. The shaft seal 7 seals the second sealing gap between the barrier medium space 4 and the environment 17 since in this sealing gap there is only a small pressure difference due to the application of a first pressure P1 that is slightly higher than the second pressure P2.

The floating ring seal 8 has a floating ring 8a and a support ring 8b. The floating ring is arranged on that side of the barrier medium wall 3 that is oriented toward the rotor shaft 15, while the support ring 8b is attached to the rotor shaft 15. In order to provide additional sealing, an auxiliary seal 18, for example in the form of an O-ring, can be arranged before the floating ring seal 8, in the direction of the barrier medium space 4. Equally, another shaft seal, for example a see-through or labyrinth seal, can be arranged after the floating ring seal 8, in the direction of the process space 13. Furthermore, an additional auxiliary seal 19, for example in the form of an O-ring, can be provided before the shaft seal 7.

The sealing system 1 illustrated in FIG. 2 makes it possible for only purified barrier medium 6, in particular purified ambient air, to be supplied to the floating ring seal 8 at a determined first pressure P1. This prevents dirt reaching the floating ring seal 8. Thus, the sealing system 1 first permits the use of a floating ring seal 8 for sealing the outer casing 11 with respect to the rotor shaft 15 of the steam turbine 10.

FIG. 3 shows a sealing system 1 which is identical to that in FIG. 2. However, this sealing system 1 is arranged within the process space 13 of the steam turbine 10 and prevents steam escaping from the process space 13 through the outer casing 11. Steam as barrier medium 6 is diverted from the process space 13, is purified in the purification device 16 and is fed via the barrier medium line 5b and the barrier medium opening 5 to the barrier medium space 4 of this sealing system 1. This ensures that only purified barrier medium 6, in particular purified steam, is supplied to the floating ring seal 8 of this sealing system 1, which markedly improves the functionality of the floating ring seal 8.

The invention claimed is:

1. A sealing system for sealing a sealing gap between an outer casing and a rotor shaft of a rotor of a steam turbine, comprising:
   a barrier medium wall to create a barrier medium space between the rotor shaft and the outer casing in a region in front of and/or in the sealing gap, wherein the barrier medium wall is attached to the outer casing,
   a barrier medium opening in the barrier medium wall for supplying barrier medium from outside into the barrier medium space at a first pressure,
   a shaft seal for sealing the barrier medium space with respect to a second space in which a second pressure, smaller than the first pressure, prevails, and
   a floating ring seal for sealing the barrier medium space with respect to a third space in which a third pressure, smaller than the second pressure, prevails,
   wherein the shaft seal and the floating ring seal are set apart from each other along the rotor shaft by a portion of the rotor shaft that bounds the barrier medium space.

2. The sealing system as claimed in claim 1,
   wherein the floating ring seal is arranged on that side of the barrier medium wall which is oriented toward the rotor shaft, and on the rotor shaft.

3. The sealing system as claimed in claim 1,
   wherein the floating ring seal has comprises a floating ring and a support ring.

4. The sealing system as claimed in claim 1, further comprising:
   a barrier medium line arranged at the barrier medium opening for fluidically connecting the barrier medium space to a barrier medium filter of the sealing system which prepares the barrier medium.

5. The sealing system as claimed in claim 4,
   wherein the barrier medium comprises purified air or purified steam.

6. The sealing system as claimed in claim 1, further comprising:
   a barrier medium valve arranged in the barrier medium opening or in a barrier medium line arranged at the barrier medium opening.

7. The sealing system as claimed in claim 1,
   wherein the barrier medium wall is comprises a first barrier medium wall and a second barrier medium wall attached to one another to form a seal therebetween.

8. The sealing system as claimed in claim 7,
   wherein the shaft seal is arranged on the first barrier medium wall and either a floating ring or a support ring of the floating ring seal is attached to the second barrier medium wall.

9. The sealing system as claimed in claim 1, wherein the shaft seal comprises a labyrinth seal formed directly between the barrier medium wall and the rotor shaft.

10. A steam turbine comprising:
an outer casing, a rotor, and a rotor shaft; and
a sealing system configured to seal a sealing gap between the outer casing and the rotor shaft of the rotor, the sealing system comprising:
  a barrier medium wall to create a barrier medium space between the rotor shaft and the outer casing in a region in front of and/or in the sealing gap, wherein the barrier medium wall is attached to the outer casing,
  a barrier medium opening in the barrier medium wall for supplying barrier medium from outside into the barrier medium space at a first pressure,
  a shaft seal for sealing the barrier medium space with respect to a second space in which a second pressure, smaller than the first pressure, prevails, and
  a floating ring seal for sealing the barrier medium space with respect to a third space in which a third pressure, smaller than the second pressure, prevails,
  wherein the shaft seal and the floating ring seal are set apart from each other along the rotor shaft by a portion of the rotor shaft that bounds the barrier medium space.

11. The steam turbine as claimed in claim 10,
wherein the outer casing comprises a screw connection for attaching the barrier medium wall of the sealing system.

12. The steam turbine as claimed in claim 10,
wherein the barrier medium wall is sealed to a side of the outer casing which faces the rotor shaft.

13. The steam turbine as claimed in claim 10,
wherein the shaft seal seals the barrier medium space with respect to the second space in which the second pressure, lower than the first pressure, prevails, and
the floating ring seal seals the barrier medium space with respect to the third space in which the third pressure, lower than the second pressure, prevails, and
the shaft seal is arranged on a side of the barrier medium wall which faces the rotor shaft.

14. The steam turbine as claimed in claim 10,
wherein a floating ring of the floating ring seal is attached on a side of the barrier medium wall which is oriented toward the rotor shaft.

15. The sealing system as claimed in claim 10, wherein the shaft seal comprises a labyrinth seal formed directly between the barrier medium wall and the rotor shaft.

* * * * *